June 12, 1928.
N. C. CHRISTENSEN
1,673,495
PROCESS FOR MAKING ANHYDROUS ALUMINUM CHLORIDE
Filed June 7, 1923
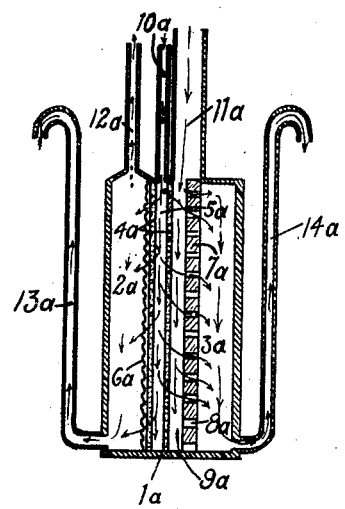
Fig. I.
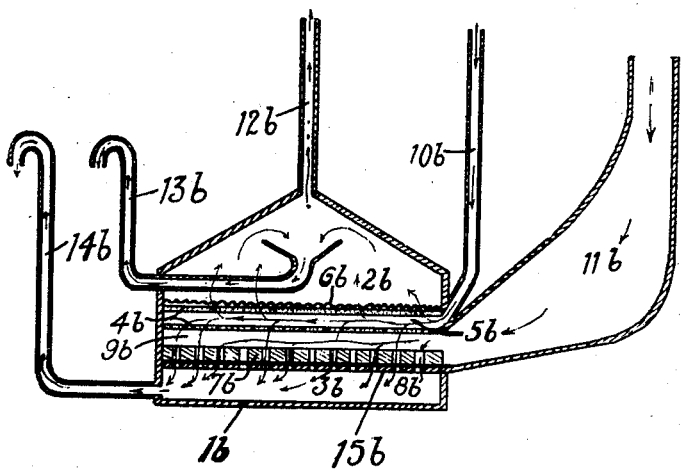
Fig. II.
Niels C. Christensen, Inventor
By Dodge and Sons
Attorneys Patented June 12, 1928.

1,673,495

UNITED STATES PATENT OFFICE.

NIELS C. CHRISTENSEN, OF SALT LAKE CITY, UTAH.

PROCESS FOR MAKING ANHYDROUS ALUMINUM CHLORIDE.

Application filed June 7, 1923. Serial No. 644,047.

This invention relates primarily to the manufacture of anhydrous aluminum chloride and secondarily to the manufacture of caustic alkali and also to the refining of lead bullion. As is well known to engineers interested in oil refining a very large quantity of anhydrous aluminum chloride would be used for the conversion of crude oil to gasoline if a suitable aluminum chloride could be secured at a price low enough to permit of its use for this purpose. As is also known to those engaged in oil refining, the known methods of manufacturing anhydrous aluminum chloride for this purpose have been so difficult and costly as to make the use of this chemical for the general manufacture of gasoline prohibitive, though it is used on a relatively small scale for the manufacture of special high quality gasoline. The many advantages in the use of anhydrous aluminum chloride for the manufacture of gasoline from crude oil in the increased percentage of recovery, the simplicity of the operation compared with other methods now in use, and the high quality of the gasoline made in this way, are well known to engineers and chemists engaged in oil refining.

It is the object of my invention to provide a simple, cheap, and efficient method of manfacturing anhydrous aluminum chloride for oil refining and other uses to which it may be put. My process is simple in operation requiring no extreme conditions of temperature or pressure or special protection against corrosive gases, and has a very high efficiency in that a practically complete conversion and recovery of the chemicals used may readily be secured. The simplicity and efficiency of the operation is such that comparatively simple apparatus may be used.

My process consists in general of heating dry lead chloride with metallic aluminum and distilling off the aluminum chloride and condensing it to the solid form. The operation is preferably carried out by heating the dry lead chloride until it melts thus driving off all traces of moisture and then adding the metallic aluminum either in the solid form or in a molten condition. The aluminum displaces the lead in the chloride forming anhydrous aluminum chloride and metallic lead as indicated in the following chemical equation:

$$3PbCl_2 + 2Al = 2AlCl_3 + 3Pb.$$

This reaction is exothermic and generates some heat or may generate a small voltage if the apparatus used is in the form of an electric cell.

The $PbCl_2$ used in my process is preferably made by the treatment of lead ores with a hot concentrated brine, containing acid or ferric chloride, in such proportion as to secure a hot concentrated lead chloride solution which is then cooled so as to precipitate lead chloride therefrom. The hot brine containing acid or ferric chloride acts very readily on oxidized ores of lead and also readily on sulphide ores of lead dissolving the lead as a chloride in the brine. The methods of treating lead ores for the recovery of the lead as a chloride is described in my Patents 1,434,087, 1,390,603, 1,415,796, 1,434,088, 1,434,085, 1,441,063, 1,441,064, 1,441,065, 1,435,891, 1,539,711, 1,539,712, 1,539,713, and 1,539,714. The method I prefer to use is that of dissolving the lead out of the ores with a brine containing hydrochloric acid in sufficient quantity to react with the lead mineral in the ore and form $PbCl_2$, as the product is more easily secured as pure lead chloride when HCl is used than when $H_2SO_4$ or $FeCl_3$ are used to dissolve the lead. If the ore treated is a sulphide the pregnant solution should have all the $H_2S$ removed by boiling or by passing air through the solution, before cooling and precipitating the $PbCl_2$, so as to avoid the carrying of any sulphide into the process for the manufacture of the $AlCl_3$.

The $PbCl_2$ may also be made by the dissolving lead chloride from volatilizing processes in a hot brine and precipitating by cooling; it may also be made by dissolving scrap lead such as battery plates and other forms of scrap in a hot acid brine and cooling as described for the treatment of ores, as the metallic lead dissolves readily in a hot acid brine.

The lead chloride may also be made in connection with the manufacture of caustic alkali from sodium chloride solutions, by using metallic lead as the anode in a double diaphragm type of electrolytic caustic cell, the chlorine acting on the lead anode to form lead chloride which dissolves in the hot sodium chloride which is within drawn from the cell when concentrated in regard to PbCl₂ and cooled to precipitate PbCl₂. This process gives Na(OH), H and PbCl₂ as indicated in the following chemical equations:

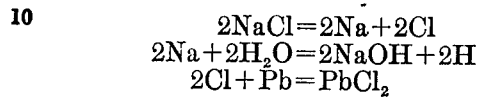

$$2NaCl = 2Na + 2Cl$$
$$2Na + 2H_2O = 2NaOH + 2H$$
$$2Cl + Pb = PbCl_2$$

This process is preferably carried out as follows:

An electrolytic caustic alkali cell of the construction shown in the drawings is preferably used, though other types may be utilized. The new and essential feature of the cell are the double diaphragm which makes possible the divided and separate flow of electrolyte which makes possible the manufacture of two soluble products such as NaOH and PbCl₂ at the same time in an electrolytic cell. Both Figs. I and II show a vertical cross-section of two types of cell which may be used. The construction and operation of the cells will be clear from the drawings and the following description: In the description and drawings the same numbers indicate corresponding parts in the two cells, the subscript "a" referring to the vertical type shown in Drawing I and the subscript "b" to the horizontal type shown in Drawing II. The space enclosed in the cell (1a, 1b) is divided into two main parts (2a, 2b) the cathode compartment in which the caustic is formed and 3a, 3b the anode compartment in which the PbCl₂ is formed, by the double diaphragm 4a, 4b which encloses a narrow space (5a, 5b). In the caustic portion or cathode compartment (2a, 2b) of the cells is a cathode (6a, 6b) consisting of an iron screen or plate perforated so as to allow the electrolyte to flow through it placed in close proximity to the diaphragm adjacent to this portion of the cell. In the anode compartment (3a, 3b) is placed a lead anode (7a, 7b) which is cast with perforations (8a, 8b) to allow the passage of the electrolyte through it. A space (9a, 9b) separates the lead anode (7a, 7b) from the diaphragm adjacent to the anode compartment of the cell. The inlet pipe (10a, 10b) allows a flow of hot lead free brine into the space 5a 5b between the two diaphragms (4a, 4b) of the double diaphragm. The inlet passage (11a, 11b) allows an inflow of hot brine, not saturated with lead chloride, to the space (9a, 9b) between the lead anode (7a, 7b) and the diaphragm (4a, 4b). The pipe (12a, 12b) allows the hydrogen to escape from the cathode compartment. The pipe (13a, 13b) allows the sodium hydroxide solution to flow out of the cathode compartment (2a, 2b) and the pipe (14a, 14b) allows the lead chloride solution to flow out of the anode compartment (3a, 3b). In the horizontal type of cell shown in Fig. II, the cathode rests on the perforated support (15b). In both cases the channel (11a, 11b) is made large enough so that the residue of lead anode may be removed for remelting and recasting when sufficient lead has been dissolved from it, and another anode may be slipped into its place through this channel.

The cells are operated as follows: Hot brine is continuously supplied to the space (5a, 5b) enclosed in the double diaphragm (4a, 4b) under sufficient head to cause it to pass through the diaphragms into the anode and cathode compartment cells at such a rate as to prevent any diffusion of the NaOH and PbCl₂ from the cathode and anode compartments back through the diaphragms into the space 5a. The diaphragm next to the anode compartment 3a, 3b, of the cell may be made of higher resistance than the diaphragm on the cathode side since a minimum flow of brine through the diaphragm into the anode compartment is desired. The rate of flow through the cathode compartment is regulated so as to secure an outflow of caustic solution of the desired strength through the outlet (13a, 13b). Hot brine carrying the amount of PbCl₂ not precipitated by cooling is continuously circulated through the anode space, being supplied through the channel (11a, 11b) passing into the space (9a, 9b) through the perforation (8a, 8b) in the cathode (7a, 7b) and out through the pipe (14a, 14b). The flow of the different solutions is indicated by the arrows. As will be noted the cells are so arranged that a uniform flow of solution through both electrodes is secured. With current supplied to the cell hot brine passes through the diaphragm into the anode compartment where NaOH and hydrogen are formed at the anode, the NaOH flowing out through the pipe (13a, 13b) and hydrogen escaping through the outlet (12a, 12b). The chlorine passing to the anode attacks the lead anode forming PbCl₂ which is dissolved by the hot brine which is continuously circulated through the anode compartment, being admitted through the channel (11a, 11b) passing through the perforations (8a, 8b) in the anode and being discharged from the anode compartment 3a through the pipes (14a, 14b). Sufficient brine flows from the space (5a, 5b) through the diaphragm into the anode compartment to prevent any diffusion of PbCl₂ into the space (5a, 5b). The lead chloride brine is circulated through the anode compartment at such a rate as to build the lead in solution up to between 6% and 7½%. This pregnant lead solution flowing from the cell is cooled and the lead chloride precipitated so that the cold solution carries from 1½% to 2% Pb. This cold solution is heated practically to boiling and returned to the cell again through the inlet channel (11a, 11b). As the formation of the lead chloride at the anode generates an E. M. F. of approximately 1.8 volts this cell operates with approximately one half the power consumption of the ordinary caustic alkali-chlorine cell. As the lead-brine circuit is continuously augmented by the small amount of brine passing into the anode compartment through the diaphragm, the lead must be precipitated from a portion of this solution at intervals with NaOH and the Pb(OH)$_2$ separated from the brine and treated with HCl and returned to the hot lead brine and the purified brine used over again. The horizontal type of cell shown in Fig. II is my preferred type as the specific gravity of the solutions formed in the cell are such that the natural flow of solution through the cell is in the direction desired.

As will readily be seen this cell and process may be used for the refining of lead bullion by using the lead bullion in the anodes as in ordinary electrolytic refining, the lead being recovered from the pure chloride formed by treatment with metallic aluminum as described. In this case the combined process of making the lead chloride and aluminum chloride would have the following final products: anhydrous AlCl$_3$, NaOH, H, and refined Pb. In case the cell is not used for refining the molten lead from the AlCl$_3$, manufacture is cast into anodes and used over again in the process. In all my methods of making PbCl$_2$, excepting the last described caustic cell method, either a sodium chloride or calcium chloride solution or brine may be used and by the term brine used in the claims I mean either a concentrated sodium chloride or calcium chloride solution.

The lead chloride made by any of the methods indicated above is washed free from contaminating salts and thoroughly dried. It is then melted preferably in a neutral atmosphere to prevent the formation of any lead oxychloride and metallic aluminum added to the molten lead chloride in the proportion required to decompose the lead chloride and form anhydrous aluminum chloride which distills off as a gas or vapor and is led into a cooling chamber where it crystallizes and settles in the form of fine crystals or builds upon the cooling surfaces as a crust which is easily removed. This operation is preferably carried out in a fused-silica Vitrosil retort externally heated. Other material may be used for the retort but in order to avoid contamination of the AlCl$_3$ and on account of its heat resisting qualities I have found Vitrosil to be the most suitable material. Iron or copper retorts may be used but are slightly acted upon by the fused PbCl$_2$ and for that reason are not well suited for the purpose. Porcelain and graphite crucibles have been tried but the former is easily broken in heating and handling and the latter is slightly permeable to both the PbCl$_2$ and AlCl$_3$ so that neither are well suited to the purpose. The retort and condensing chamber should preferably be air tight so as to avoid slight oxidation of the lead chloride and decomposition of the AlCl$_3$ which occur if much air is admitted during the heating and distilling operation.

From the foregoing it will be apparent that my process constitutes a simple and valuable method of manufacturing anhydrous aluminum chloride and at the same time recovering the lead from lead chloride formed in the treatment of ores by leaching with chloride solutions. It will also be apparent that my process constitutes a simple and valuable method of manufacturing anhydrous aluminum chloride and at the same time recovering lead from scrap metal such as battery plates and other forms of scrap lead. It will also be apparent that my process constitutes a simple and valuable method of manufacturing anhydrous aluminum chloride and at the same time manufacturing caustic soda and hydrogen. It will also be apparent that my process constitutes a simple and valuable method of manufacturing anhydrous aluminum chloride and at the same time refining lead bullion and manufacturing caustic soda and hydrogen.

As will be clear to all engineers engaged in the metallurgical field, it is impossible to give all the minute details of practical operation of the different parts of my process or all the details of construction of the apparatus used and I do not therefore desire to be limited by the foregoing necessarily brief description except as interpreted in the claims, though the foregoing description is ample to make the invention and its practical use clear to all engineers or metallurgists familiar with the metallurgical and chemical practices involved in similar and related operations.

No claim is made herein to the process of making lead chloride and caustic alkali, which consists in electrolyzing a hot brine in a double diaphragm cell with a lead anode substantially as described, whereby a lead chloride brine solution is formed at the anode and a causic brine solution at the cathode; nor is any claim made to the electrolytic cell hereinbefore set forth, the claims thereto having been withdrawn from this application pursuant to the Patent Office requirement. Said matter forms the basis of my divisional application Serial No. 115,045 filed June 10th, 1926.

Having described my process, what I claim and desire to patent is:

1. The process of making anhydrous aluminum chloride which consists in heating dry lead chloride together with metallic aluminum whereby anhydrous aluminum chloride and metallic lead are formed.

2. The process of making anhydrous aluminum chloride which consists in heating dry lead chloride together with metallic aluminum, and thereby reducing the lead chloride and forming metallic lead and anhydrous aluminum chloride.

3. The process of making anhydrous aluminum chloride which consists in heating dry lead chloride together with metallic aluminum, whereby metallic lead and anhydrous aluminum chloride are formed, and distilling off said aluminum chloride and cooling and crystallizing said aluminum chloride.

4. The process of making anhydrous aluminum chloride which consists in heating dry lead chloride together with metallic aluminum, and thereby reducing the lead chloride and forming metallic lead and anhydrous aluminum chloride and distilling off said aluminum chloride and cooling and crystallizing said aluminum chloride.

5. The process of making anhydrous aluminum chloride which consists in adding metallic aluminum to molten lead chloride whereby metallic lead and anhydrous aluminum chloride are formed.

6. The process of making anhydrous aluminum chloride which consists in adding metallic aluminum to molten lead chloride and thereby reducing the lead chloride and forming molten metallic lead and anhydrous aluminum chloride, and distilling off said aluminum chloride and cooling and condensing said aluminum chloride.

7. The process of making anhydrous aluminum chloride which consists in mixing melted aluminum with dry lead chloride and thereby reducing the lead chloride and forming metallic lead and anhydrous aluminum chloride.

8. The process of making anhydrous aluminum chloride which consists in mixing melted aluminum with dry lead chloride and thereby reducing the aluminum chloride and forming metallic lead and anhydrous aluminum chloride and distilling off said aluminum chloride and cooling and condensing said aluminum chloride.

9. The process of making anhydrous aluminum chloride which consists in mixing molten aluminum and molten lead chloride and thereby reducing the aluminum chloride and forming metallic lead and anhydrous aluminum chloride.

10. The process of making anhydrous aluminum chloride which consists in mixing molten aluminum and molten lead chloride and thereby reducing the lead chloride and forming metallic lead and anhydrous aluminum chloride and distilling off said aluminum chloride and cooling and condensing said aluminum chloride.

11. The process of making anhydrous aluminum chloride which consists in dissolving metallic lead in a hot concentrated brine by using metallic lead as the anode of a double diaphragm caustic alkali cell substantially as described and forming a hot concentrated lead chloride solution, cooling said concentrated lead chloride solution and precipitating lead chloride therefrom, separating said lead chloride from said brine, drying said lead chloride, heating said dry lead chloride together with metallic aluminum and forming metallic lead and aluminum chloride, distilling off said aluminum chloride and cooling and crystallizing said aluminum chloride and using said reduced lead over again in the anode of said cell to make more lead chloride.

12. The process of making anhydrous aluminum chloride which consists in dissolving metallic lead in a hot concentrated brine by using lead bullion as the anode of a double diaphragm caustic alkali cell substantially as described and forming a hot concentrated lead chloride solution, cooling said concentrated lead chloride solution and precipitating lead chloride therefrom, separating said lead chloride from said brine, drying said lead chloride, heating said dry lead chloride together with metallic aluminum and forming metallic lead and aluminum chloride, distilling off said aluminum chloride and cooling and crystallizing said aluminum chloride and using said reduced lead over again in the anode of said cell to make more lead chloride.

13. A process for the production of aluminum chloride which consists in heating aluminum in the presence of the chloride of a metal having a less affinity for chlorin than aluminum at high temperatures to a reacting temperature and separating the aluminum chloride formed from the residue.

14. A process of manufacturing aluminum chloride which consists in heating aluminum and the chloride of a metal having a less affinity for chlorin at high temperatures than aluminum to a temperature at which the aluminum chloride is volatile thereby forming aluminum chloride vapors and condensing the vapors as they are formed.

15. A process for the manufacture of aluminum chloride which consists in heating aluminum and the chloride of a metal having a less affinity for chlorin at high temperatures than aluminum to a reacting temperature, permitting the reaction to continue by the heat of the reaction thereby driving off aluminum chloride as it is formed in vaporous condition and condensing it.

16. A process for the manufacture of aluminum chloride which consists in melting the chloride of a metal having a less affinity for chlorin than aluminum at high temperatures, bringing the chloride and aluminum into contact with each other at a reacting temperature and separating the aluminum chloride formed.

17. A process for the manufacture of aluminum chloride which consists in melting a chloride of a metal having a less affinity for chlorin than aluminum, bringing the molten chloride into contact with aluminum at a temperature at which the salt and metal react upon each other and at which aluminum chloride is volatile, driving off the aluminum chloride vapors and condensing them.

18. A process for the manufacture of aluminum chloride which consists in bringing aluminum into contact with the chloride of a metal having a less affinity for chlorin than aluminum at a temperature at which aluminum chloride is volatile, volatilizing the aluminum chloride formed and condensing it.

19. A process for the production of aluminum chloride which consists in melting the chloride of a metal having less affinity for chlorin than aluminum, bringing it into contact with aluminum, raising the temperature to a point at which reaction takes place but at which the chloride is non-volatile, driving off vapors of chloride of aluminum and condensing them.

NIELS C. CHRISTENSEN.